US010448379B2

(12) United States Patent
Bendlin et al.

(10) Patent No.: US 10,448,379 B2
(45) Date of Patent: Oct. 15, 2019

(54) ENHANCED DOWNLINK CONTROL CHANNEL CONFIGURATION FOR LTE

(71) Applicant: TEXAS INSTRUMENTS INCORPORATED, Dallas, TX (US)

(72) Inventors: Ralf Matthias Bendlin, Plano, TX (US); Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/887,305

(22) Filed: May 4, 2013

(65) Prior Publication Data

US 2013/0294368 A1    Nov. 7, 2013

Related U.S. Application Data

(60) Provisional application No. 61/646,448, filed on May 14, 2012, provisional application No. 61/645,980, filed on May 11, 2012, provisional application No. 61/645,323, filed on May 10, 2012, provisional application No. 61/642,763, filed on May 4, 2012.

(51) Int. Cl.
*H04W 72/04* (2009.01)
*H04L 5/00* (2006.01)

(52) U.S. Cl.
CPC .................. *H04W 72/042* (2013.01)

(58) Field of Classification Search
CPC ....... H04L 5/0053; H04L 5/00; H04L 5/0051; H04W 72/042; H04W 72/04
USPC ........................................................ 370/329
See application file for complete search history.

(56) References Cited

U.S. PATENT DOCUMENTS

| 8,526,486 B2 * | 9/2013 | Tsui .................. H04L 25/03057 375/229 |
| 2010/0002877 A1 * | 1/2010 | Zhang ................... H04L 9/0662 380/46 |
| 2011/0066166 A1 * | 3/2011 | Levin ..................... A61B 17/00 606/151 |
| 2012/0069790 A1 * | 3/2012 | Chung ................ H04W 72/042 370/315 |
| 2012/0099545 A1 * | 4/2012 | Han ....................... H04L 1/0028 370/329 |
| 2013/0039284 A1 * | 2/2013 | Marinier ................. H04L 5/001 370/329 |
| 2013/0044664 A1 * | 2/2013 | Nory et al. .................... 370/311 |

(Continued)

FOREIGN PATENT DOCUMENTS

EP    2804355 A1 * 11/2014
EP    2827663 A1 *  1/2015

*Primary Examiner* — Khaled M Kassim
*Assistant Examiner* — Berhanu D Belete
(74) *Attorney, Agent, or Firm* — Gregory J. Albin; Charles A. Brill; Frank D. Cimino

(57) ABSTRACT

A method of operating a wireless communication system (FIG. 4) is disclosed. The method includes receiving downlink control information (702) for transmission to a user equipment (UE) in enhanced physical downlink control channel (EPDCCH). A pseudo-random number generator is initialized (706) for generating a pseudo-random sequence. A plurality of demodulation reference signals (DMRS) are generated with the pseudo-random sequence. The plurality of DMRS is mapped with the EPDCCH and transmitted to the UE (712).

14 Claims, 11 Drawing Sheets

(56) References Cited

U.S. PATENT DOCUMENTS

| | | | |
|---|---|---|---|
| 2013/0064216 A1* | 3/2013 | Gao | H04L 5/0016 370/330 |
| 2013/0100901 A1* | 4/2013 | Shan et al. | 370/329 |
| 2013/0188558 A1* | 7/2013 | Nam | H04W 24/02 370/328 |
| 2013/0195068 A1* | 8/2013 | Baker | H04L 5/0023 370/330 |
| 2013/0242904 A1* | 9/2013 | Sartori | H04L 5/0053 370/329 |
| 2013/0252606 A1* | 9/2013 | Nimbalker | H04B 17/309 455/434 |
| 2013/0259098 A1* | 10/2013 | Sorrentino | H04L 27/2613 375/219 |
| 2013/0301434 A1* | 11/2013 | Krishnamurthy | H04L 1/0026 370/252 |
| 2013/0301543 A1* | 11/2013 | Eriksson | H04W 72/00 370/329 |
| 2014/0036747 A1* | 2/2014 | Nory | H04W 72/0406 370/311 |
| 2014/0078978 A1* | 3/2014 | Cheng | H04L 5/0053 370/329 |
| 2014/0092822 A1* | 4/2014 | Koorapaty | H04L 5/0039 370/329 |
| 2014/0112252 A1* | 4/2014 | Hoymann et al. | 370/328 |
| 2014/0126487 A1* | 5/2014 | Chen et al. | 370/329 |
| 2014/0133590 A1* | 5/2014 | Ahn | H04W 48/12 375/260 |
| 2014/0254420 A1* | 9/2014 | Kim | H04L 5/001 370/252 |
| 2014/0307560 A1* | 10/2014 | Kim | H04L 5/001 370/241 |
| 2014/0307700 A1* | 10/2014 | Seo | H04L 5/0053 370/329 |
| 2014/0314038 A1* | 10/2014 | Seo | H04L 5/0023 370/329 |
| 2014/0341180 A1* | 11/2014 | Liu | H04L 5/0051 370/330 |
| 2015/0055581 A1* | 2/2015 | Janis | H04B 7/046 370/329 |
| 2015/0063281 A1* | 3/2015 | Xu | H04W 16/02 370/329 |
| 2015/0098409 A1* | 4/2015 | Li et al. | 370/329 |
| 2015/0181588 A1* | 6/2015 | Song | H04L 1/1607 370/280 |

\* cited by examiner

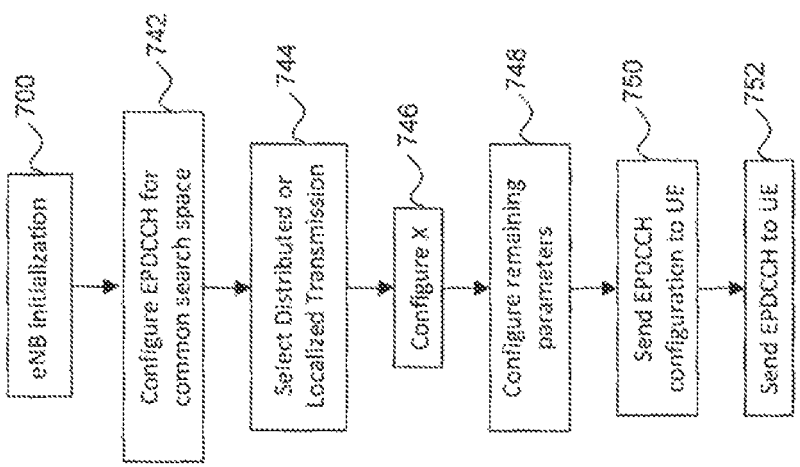

ENHANCED DOWNLINK CONTROL CHANNEL CONFIGURATION FOR LTE

This application claims the benefit under 35 U.S.C. § 119(e) of Provisional Appl. Nos. 61/642,763, filed May 4, 2012, 61/645,323, filed May 10, 2012, 61/645,980, filed May 11, 2012, and 61/646,448, filed May 14, 2012, which are incorporated herein by reference in their entirety.

BACKGROUND OF THE INVENTION

The present embodiments relate to wireless communication systems and, more particularly, to operation of a Coordinated Multi-Point (CoMP) communication system in which a user equipment (UE) simultaneously communicates with plural base stations (eNB).

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are cell-specific reference signals (CRS), channel state information reference signals (CSI-RS), and demodulation reference signals (DMRS). These reference signals are useful for channel measurement at the receiver. Cell-specific reference signals as well as channel state information reference signals are not precoded and are generated by a pseudo-random sequence generator as a function of the physical cell ID. In Releases 8 through 10 of the Long Term Evolution (LTE) of the Universal Mobile Telecommunications System (UMTS), which was designed for conventional point-to-point communication, the cell ID is not explicitly signaled by the base station (called eNB) but is implicitly derived by the UE as a function of the primary synchronization signal (PSS) and secondary synchronization signal (SSS). To connect to a wireless network, the UE performs a downlink cell search to synchronize to the best cell. A cell search is performed by detecting the PSS and SSS of each available cell and comparing their respective signal quality, for example, in terms of reference signal received power (RSRP). After the cell search is performed, the UE establishes connection with the best cell by deriving relevant system information for that cell. Similarly, for LTE Release 11 the UE performs an initial cell search to connect to the best cell. To enable multi-point CoMP operation, the connected cell then configures the UE by higher-layer signaling with a virtual cell ID for each CSI-RS resource associated with each respective base station involved in the multi-point CoMP operation. The UE generates the pseudo-random sequence for each CSI-RS resource as a function of the virtual cell ID.

Conventional cellular communication systems operate in a point-to-point single-cell transmission fashion where a user terminal or equipment (UE) is uniquely connected to and served by a single cellular base station (eNB or eNodeB) at a given time. An example of such a system is Release 8 of the 3GPP Long-Term Evolution. Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system. This greatly improves received signal strength at the UE by transmitting the same signal to each UE from different base stations. This is particularly beneficial for cell edge UEs that observe strong interference from neighboring base stations.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 (eNB) is operable over corresponding coverage areas 104, 105, and 106. Each base stations coverage area is further divided into cells. In the illustrated network, each base station's coverage area is divided into three cells. A handset or other user equipment (UE) 109 is shown in cell A 108. Cell A 108 is within coverage area 104 of base station 101. Base station 101 transmits to and receives transmissions from UE 109. As UE 109 moves out of Cell A 108 into Cell B 107, UE 109 may be handed over to base station 102. Because UE 109 is synchronized with base station 101, UE 109 can employ non-synchronized random access for a handover to base station 102. UE 109 also employs non-synchronous random access to request allocation of uplink 111 time or frequency or code resources. If UE 109 has data ready for transmission, which may be user data, a measurements report, or a tracking area update, UE 109 can transmit a random access signal on uplink 111. The random access signal notifies base station 101 that UE 109 requires uplink resources to transmit the UE's data. Base station 101 responds by transmitting to UE 109 via downlink 110 a message containing the parameters of the resources allocated for the UE 109 uplink transmission along with possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval. Base station 101 configures UE 109 for periodic uplink sounding reference signal (SRS) transmission. Base station 101 estimates uplink channel quality indicator (CQI) from the SRS transmission.

Downlink transmission in Long Term Evolution (LTE) is organized in subframes. Referring now to FIG. 2, there is a diagram of a downlink subframe in LTE. Each subframe 201 is of 1 ms time duration. Each subframe comprises twelve OFDM symbols with Extended Cyclic Prefix (CP) or fourteen OFDM symbols with Normal Cyclic Prefix (CP). The system bandwidth 215 consists of a plurality of L Physical Resource Blocks (PRB), where each PRB is composed of twelve OFDM tones called sub-carriers. The PRB is the smallest time-frequency resource allocation unit in LTE, where data transmission to a user is scheduled on one or multiple PRBs. Different PRBs in one subframe 201 are allocated for data transmission to different users. Furthermore, the set of PRBs on which a user receives downlink data transmission may change from one subframe to another.

In addition to downlink data, a base station also needs to transmit control information to mobile users. This includes both common control information as well as user-specific control information. Common control information is transmitted to all users in the cell to maintain users' connection to the network, page users in idle mode when a call comes in, schedule random access response, and indicate critical system information changes in the cell. In addition, user-specific control information is transmitted to each scheduled user, for example, to indicate the frequency resources on which the UE is expected to receive downlink data or transmit uplink data. In LTE, each subframe is divided into legacy control region 206 for downlink control information transmission and data region 207 for downlink data transmissions. The legacy control region 206 comprises OFDM symbols 1-3 when the system bandwidth is greater than 10 PRBs and OFDM symbols 2-4 otherwise. The exact size of the legacy control region is signaled on a Physical Downlink Control Format Indicator Channel (PCFICH). The data channel region 207 is located after the legacy control channel region 206 and is allotted for each Physical Resource Block (PRB). The legacy control channel region 206 is a region to which a Physical Downlink Control Channel (PDCCH) is mapped. The data channel region 207 is a region to which a Physical Downlink Shared Channel (PDSCH) is mapped and carries downlink data transmission to mobile users. Further, Enhanced Physical Downlink Control Channels EPDCCH Set 1 209 and EPDCCH Set 2 213 are frequency multiplexed with the data channel (PDSCH) 211 for transmission to a UE. That is, EPDCCH Set 1 209 and EPDCCH Set 2 213 are mapped to the data channel region 207 together with the PDSCH 211. The reason to locate the legacy control channel region at the beginning of the subframe is that a UE firstly receives a PDCCH allotted to the legacy control channel region 206 to recognize the presence of transmission of the PDSCH. Once the presence of transmission of the PDSCH is recognized, the UE may determine whether to perform a receiving operation of the PDSCH. If no PDCCH is transmitted to the UE, it is unnecessary to receive the PDSCH mapped to the data channel region 207. Accordingly, the UE may save power consumed in a receiving operation of the PDSCH. Meanwhile, the UE may receive a PDCCH located in the control channel region faster than the PDSCH 211 to reduce a scheduling delay. However, because the PDCCH is transmitted over the entire system bandwidth, interference control is impossible.

The legacy control channel region 206 may not be changed to a frequency multiplexing structure to maintain compatibility with an existing or legacy UE. However, if the eNodeB does not allot a corresponding region of the data channel region 207 to a UE of a previous LTE version, the UE of a previous LTE version does not receive a resource mapped to a corresponding data channel region 207. Accordingly, the eNodeB may transmit an EPDCCH for a UE of a new LTE version in a data channel region 207 that is not allotted to the UE. In other words, an EPDCCH being a control channel for a UE of a new LTE version has a structure multiplexed with the PDSCH.

While the preceding approaches provide steady improvements in wireless communications, the present inventors recognize that still further improvements in transmission of EPDCCH from the eNB to the UE are possible. Accordingly, the preferred embodiments described below are directed toward this as well as improving upon the prior art.

BRIEF SUMMARY OF THE INVENTION

In a preferred embodiment of the present invention, there is disclosed a method of operating a wireless communication system. The method includes receiving downlink control information for transmission to a user equipment (UE) in an enhanced physical downlink control channel (EPDCCH). A pseudo-random number generator is initialized for generating a pseudo-random sequence. A plurality of demodulation reference signals (DMRS) is generated with the pseudo-random sequence. The plurality of DMRS is mapped with the EPDCCH and transmitted to the UE.

BRIEF DESCRIPTION OF THE SEVERAL VIEWS OF THE DRAWING

FIG. 7C is a flow chart showing configuration of an EPDCCH common search space according to the present invention.

DETAILED DESCRIPTION OF THE INVENTION

Figure 1:
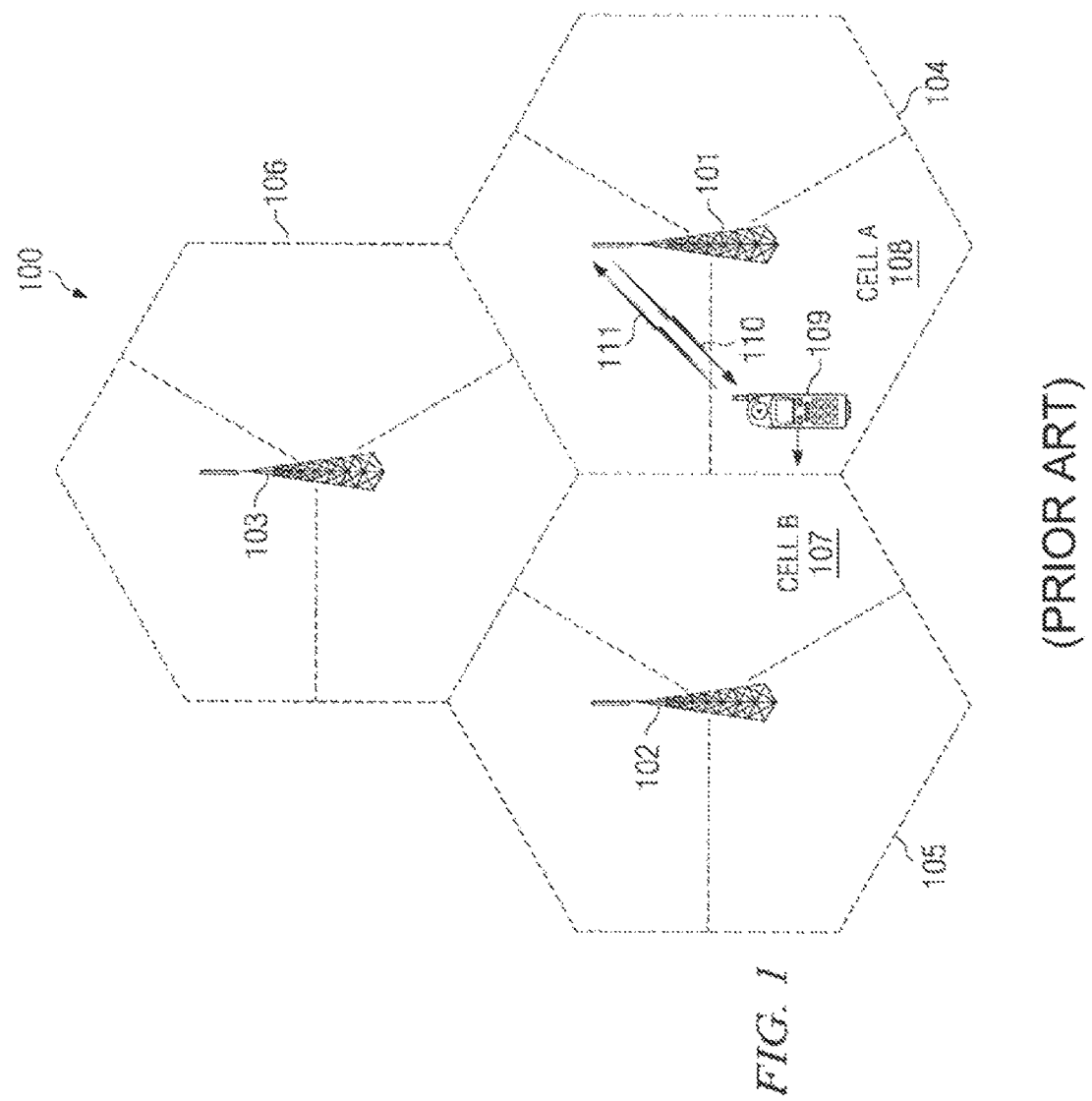
FIG. 1 is a diagram of a wireless communication system of the prior art.
Figure 2:
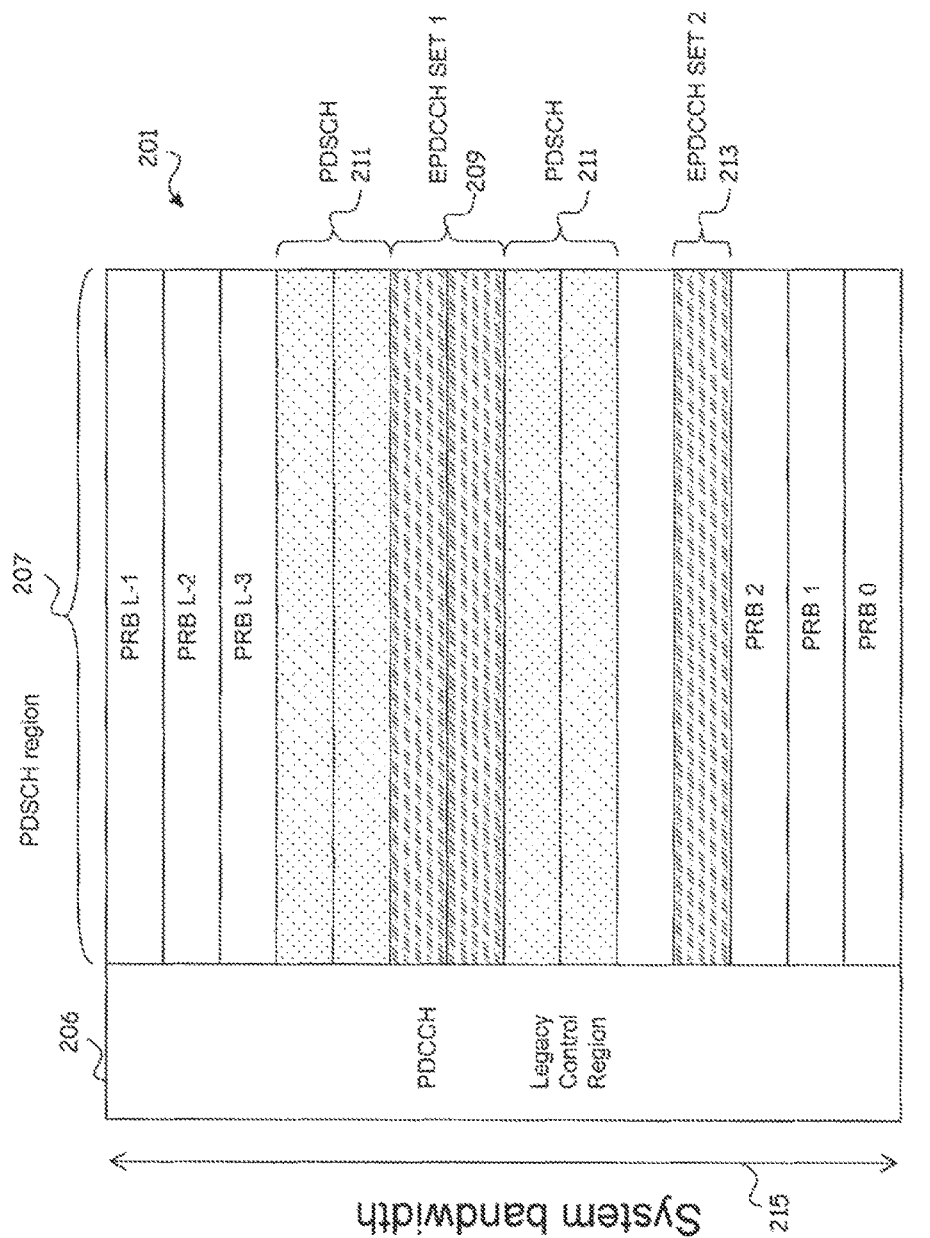
FIG. 2 is a diagram of an LTE downlink subframe of the prior art.

Communication of downlink control information from a base station (eNB) to a user equipment (UE) for Long Term Evolution (LTE) with backwards compatibility to legacy systems is essential for operating a coordinated multi-point (CoMP) LTE wireless communication system. This control information specifies the location of respective data signals for the UE within received subframes. Accordingly, embodiments of the present invention employ both localized and distributed transmission of control information to improve communication from the eNB to the UE as will be described in detail.

The following abbreviations are used throughout the instant specification.

CCE: Control Channel Element
CQI: Channel Quality Indicator
CRS: Cell-specific Reference Signal
CSI: Channel State Information
CSI-RS: Channel State Information Reference Signal
DCI: Down Control Information
DL: DownLink
DMRS: Demodulation Reference Signal
eNB: E-UTRAN Node B or base station or evolved Node B
E-UTRAN: Evolved Universal Terrestrial Radio Access Network
IRC: Interference Rejection Combining
JT: Joint Transmission
LTE Long Term Evolution
MIMO: Multiple-Input Multiple-Output
MRC: Maximum Ratio Combining
PCFICH: Physical Control Format Indicator Channel
PDCCH: Physical Downlink Control Channel
PDSCH: Physical Downlink Shared Channel
PMI: Precoding Matrix Indicator
PRB: Physical Resource Block PUCCH: Physical Uplink Control Channel
PUSCH: Physical Uplink Shared Channel
QAM: Quadrature Amplitude Modulation
RE: Resource Element
RI: Rank Indicator
RRC: Radio Resource Control
SCID: Scrambling Identification
SNR: Signal to Noise Ratio
UE: User Equipment
UL: UpLink
VRB: Virtual Resource Block Scheduling in a wireless network is achieved by the base station (eNB in LTE) transmitting downlink control information to mobile terminals (UE in LTE). In a cellular wireless network, a base station may need to schedule transmissions to multiple mobile users at the same time. As a result, the base station needs to transmit downlink control information to different users simultaneously. It is also possible that the base station may transmit different types of control information to a UE simultaneously, such as common control information and UE-specific control information.

In LTE, downlink control information bits are carried in a Downlink Control Information (DCI) format. A DCI is channel encoded, modulated, and transmitted in a specific physical transmission channel over an air interface. In a legacy system, DCI formats are transmitted by the Physical Downlink Control Channel (PDCCH). A PDCCH is transmitted in the PDCCH region. Different DCI formats are used for different scheduling purposes. DCI can be used to transmit common control information to all users in a cell, UE-specific downlink control information to schedule PDSCH data transmission to a UE, or UE-specific downlink control information to schedule uplink data transmission from the UE to the eNB.

Table I below is a relation between DCI formats and corresponding downlink transmission modes. The DCI formats are UE-specific, monitored by UEs, and scrambled by C-RNTI.

| DL Mode | DCI format | Transmission scheme |
| --- | --- | --- |
| Mode 1 | DCI 1A | Single antenna port with cell-specific reference signal (CRS) port 0 |
| Mode 2 | DCI 1 | Transmit diversity |
| Mode 3 | DCI 2A | Open-loop spatial multiplexing |
| Mode 4 | DCI 2 | Closed-loop spatial multiplexing |
| Mode 5 | DCI 1D | Single-layer multiuser MIMO with CRS |
| Mode 6 | DCI 1B | Single-layer closed-loop precoding with CRS |
| Mode 7 | DCI 1 | Single-layer beamforming with demodulation reference symbol (DMRS) port 5 |
| Mode 8 | DCI 2B | Dual-layer spatial multiplexing with DMRS ports 7-8 |
| Mode 9 | DCI 2C | 8-layer spatial multiplexing with DMRS ports 7-14 |
| Mode 10 | DCI 2D | Coordinated Multi-Point communication, 8-layer spatial multiplexing with DMRS or 7-14 |

In LTE Release 11, a new physical channel called Enhanced Physical Downlink Control Channel (EPDCCH) is defined to transmit downlink control information in a cell. As an additional physical resource for control information, the EPDCCH is transmitted in a subset of physical resource blocks (PRB) in the data region 207 and outside of the legacy PDCCH control region 206. The eNB may configure plural EPDCCH sets in the downlink. Each EPDCCH set comprises a subset of PRBs which are semi-statically configured by radio resource control (RRC) higher layer signals.

For each UE, the configured EPDCCH set(s) may be orthogonal or partially overlapping. EPDCCH sets are configured in a UE-specific manner and could be identical or different for different users.

The objective of the EPDCCH is to increase the control channel capacity due to the proliferation of mobile users in the wireless network. Secondly, the EPDCCH is transmitted by demodulation reference signal (DMRS) based beamforming, achieving more flexible beamforming gain enabled by large scale MIMO array. Thirdly, because the EPDCCH is transmitted in a few PRBs in the system bandwidth, frequency domain Inter-cell Interference Coordination (ICIC) is achieved. Neighboring cells creating strong inter-cell interference may transmit their EPDCCHs in orthogonal PRBs so as to avoid interference on the control channel.

Figure 3:
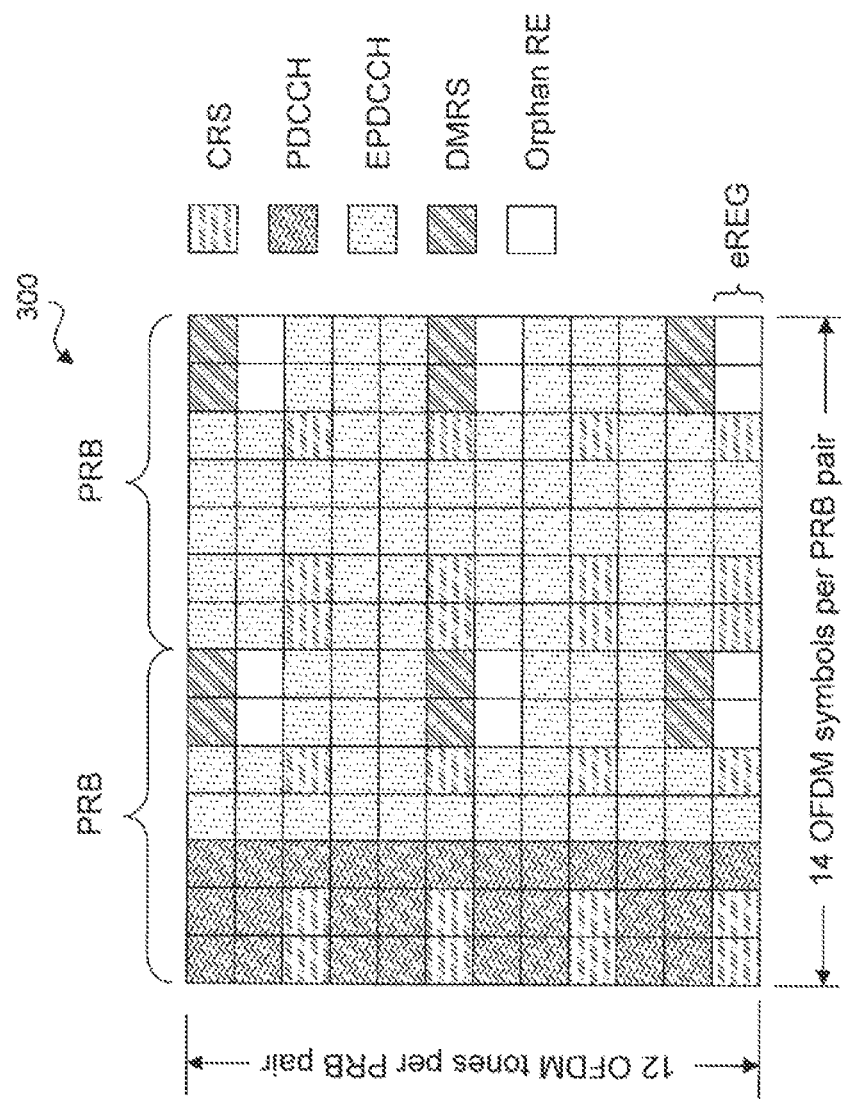
FIG. 3 is a diagram of a Physical Resource Block (PRB) pair according to a first embodiment of the present invention.

Turning now to FIG. 3, there is a diagram of a subframe 300 having a Physical Resource Block (PRB) pair according to a first embodiment of the present invention. The eNB may configure 1, 2, 4, or 8 PRB pairs for transmission to the UE. However, each PRB pair is a replica, and only one PRB pair is shown for the purpose of explanation. Each column of the diagram of the subframe corresponds to 12 subcarriers or tones in an OFDM symbol. There are 14 OFDM symbols in the subframe with a normal cyclic prefix (CP). The 3 OFDM symbols on the left side of the subframe include resource elements (REs) the transmission of a legacy physical downlink control channel (PDCCH) and legacy cell-specific reference signals (CRS). These 3 OFDM symbols are necessary for backwards compatibility with previous wireless standards. The 11 OFDM symbols on the right include resource elements (REs) for transmission of an enhanced physical downlink control channel (EPDCCH), and demodulation reference signals (DMRS), as well as cell-specific reference signals (CRS) and orphan or unused REs. Orphan REs may exist because the UE shall always assume that 24 REs are reserved for DMRS transmission in a PRB pair configured for EPDCCH transmission. The subframe is also divided into enhanced resource element groups (eREG). The eREGs are used to form enhanced control channel elements (eCCEs) without regard to whether they belong to a localized or distributed EPDCCH candidate. In the example of FIG. 3, a single row or tone of a PRB may form one eREG so that there are 12 eREGs in each subframe per PRB configured for EPDCCH transmission.

Figure 4:
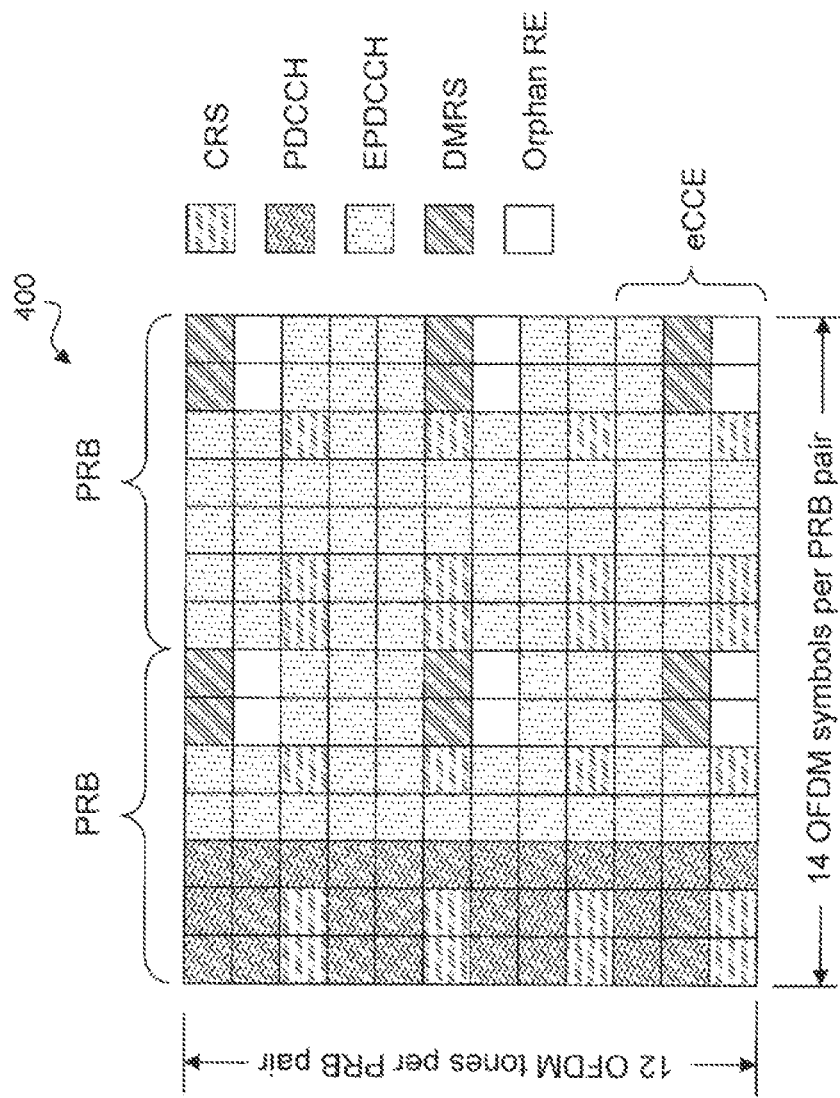
FIG. 4 is a diagram of a Physical Resource Block (PRB) pair according to a second embodiment of the present invention.

FIG. 4 has the same configuration as FIG. 3. Here, an enhanced control channel element (eCCE) includes 3 eREGs. Each eCCE may be part of a UE-specific or a common search space. When a UE receives the subframe, it must determine which eCCE, if any, includes control data intended for the UE. This is preferably accomplished by blind decoding the eCCE or sets thereof.

Both localized and distributed transmission modes are possible for the EDPCCH. Localized transmission is primarily used to reap scheduling gain (e.g. in frequency-selective channels) and beamforming gain (e.g. in correlated antenna setup). Distributed transmission is mainly used to achieve diversity gain and to improve link robustness (e.g. in uncorrelated antenna setup and at high Doppler where CSI feedback is unreliable). The difference between "localized," and "distributed" transmissions may be defined in several ways. In one definition, they are defined in terms of EPDCCH resource configuration. If the configured EPDCCH resources are adjacent in the frequency domain, it is localized transmission. However, when the PRB resources are not adjacent in the frequency domain, it is distributed transmission. Since the EPDCCH PRB resources are semi-statically configured by a higher layer, it does not matter from the EPDCCH demodulation perspective whether the PRBs are adjacent in frequency or not. UE behavior is exactly the same in both cases.

In another definition, localized and distributed transmission is defined in terms of EPDCCH resource mapping. With distributed transmission, an EPDCCH for a particular user is transmitted across a set of PRBs even if a smaller set of PRBs would be sufficient for transmitting the EPDCCH. With localized transmission, an EPDCCH is transmitted in the smallest number of PRBs required for transmitting the EPDCCH.

More specifically, for a localized transmission all eREGs in one eCCE need to be in the same PRB. The eREGs need not necessarily be adjacent but may be permuted within the PRB. For a distributed transmission, the eREGs in one eCCE are distributed across one or multiple PRB pairs to harness frequency diversity. The benefit of such a design is that the definition of an eREG is identical for both localized and distributed transmission. In effect, the only difference is how the eREGs are spread in frequency to form an eCCE. For both localized and distributed transmission, however, an eREG is always confined to one PRB pair.

The sequence of reference symbols or pilots transmitted by the eNB in the DMRS are preferably generated by a pseudo-random number generator and, subsequently, reproduced by another pseudo-random number generator at the LIE allowing it to estimate the channel by comparing the reproduced sequence of symbols or pilots with the received DMRS. The pseudo-random number generators are initialized or seeded by the parameter $c_{init}$ as shown in equation [1].

$$c_{init} = \left(\left\lfloor \frac{n_s}{2} \right\rfloor + 1\right)(2X + 1)2^{16} + n_{SCID} \quad [1]$$

In a preferred embodiment of the present invention, $n_s$ is an integer that may be greater than or equal to 2 and X is a parameter having a value from 0 to 503 which is transmitted to the UE try higher level RRC signaling. The parameter $n_{SCID}$ is preferably fixed by specification, for example, to a value of 0 or 1 or, alternatively, may also be transmitted to the UE by higher level RRC signaling. In an alternative embodiment of the present invention, the parameter X may have a default value (for example, the physical cell ID of the cell the UE is connected to) that is only changed by RRC signaling when necessary. The same values of X and parameter $n_{SCID}$ are preferably used to initialize the pseudo-random number generators at the transmitter and receiver for generation of the DMRS sequence associated with an EPDCCH.

Figure 5A:
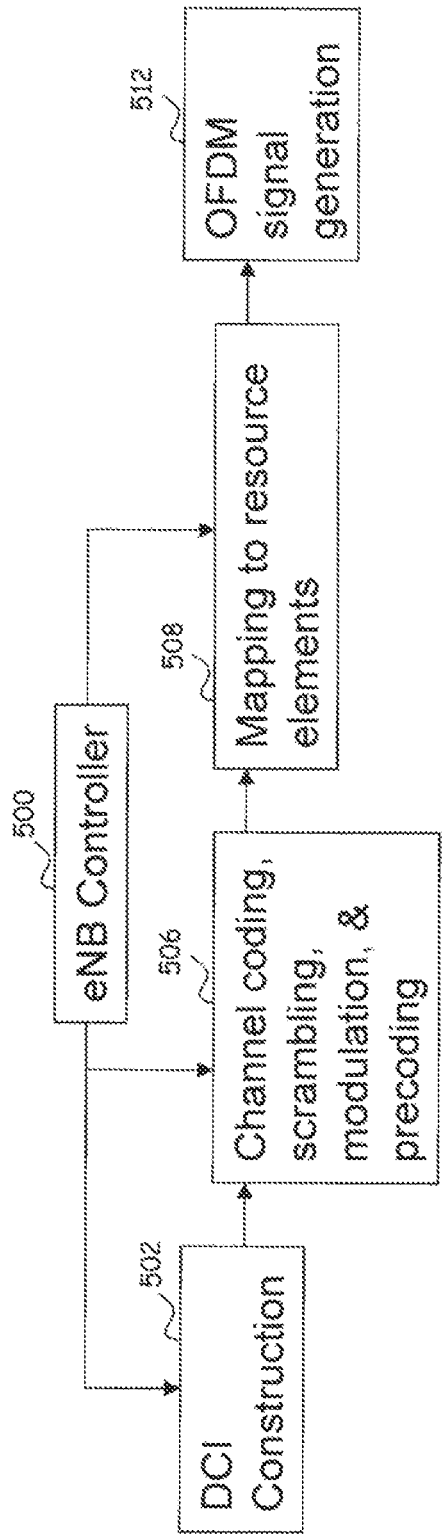
FIGS. 5A-5B are simplified block diagrams of a base station (eNB) according to the present invention.

Referring now to FIG. 5A, there is a simplified block diagram of a base station (eNB) according to the present invention. The base station includes eNB controller 500, which directs operation of the base station for both downlink and uplink operation. In particular, eNB controller 500 generates UE-specific DCI formats carrying UE-specific control information according to a specific transmission mode (Table I) and/or common control information at black 502. Each DCI is channel encoded, scrambled, modulated, and precoded at block 506. The output of block 506 is then mapped to resource elements reserved for EPDCCH transmissions for that UE according to a specified rule at block 508. OFDM symbols are generated and transmitted to the UE on the physical channel at block 512.

Figure 5B:
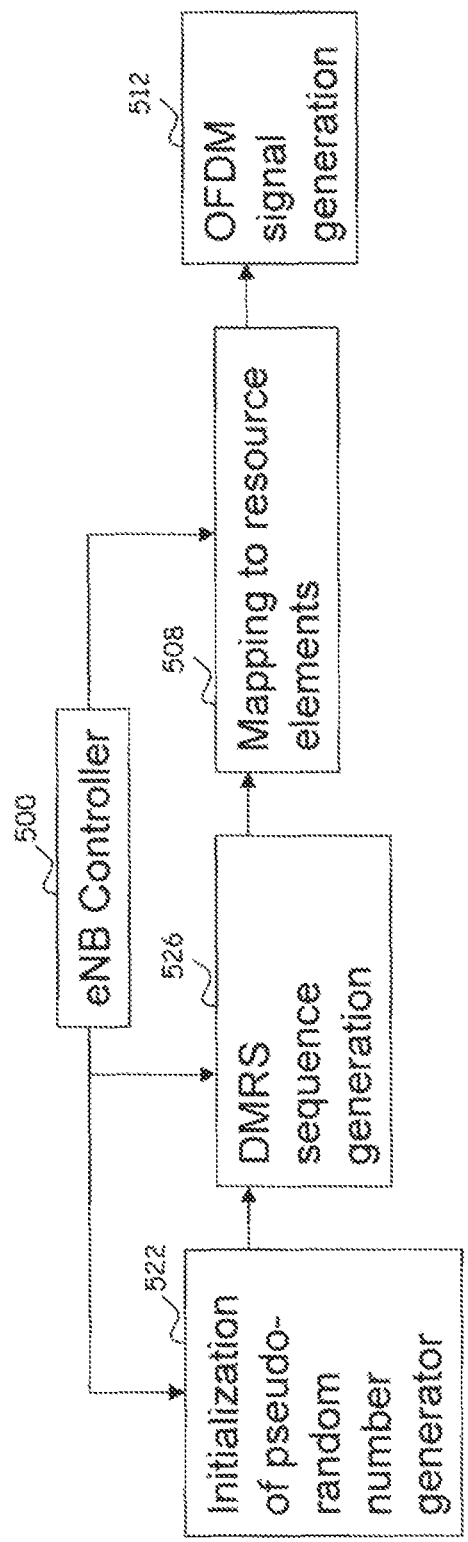

Referring now to FIG. 5B, for each EPDCCH transmission the eNB controller 500 generates a UE specific DMRS sequence using the pseudo-random number generator at block 522. In particular, the pseudo-random number generator is initialized according to equation [1] above. The output of block 522 is then used at block 526 to generate the DMRS sequence used by the receiver to estimate the channel. The mapping of the DMRS sequence to resource elements occurs at block 508. OFDM symbols are generated and transmitted to the UE on the physical channel at block 512.

Figure 6A:
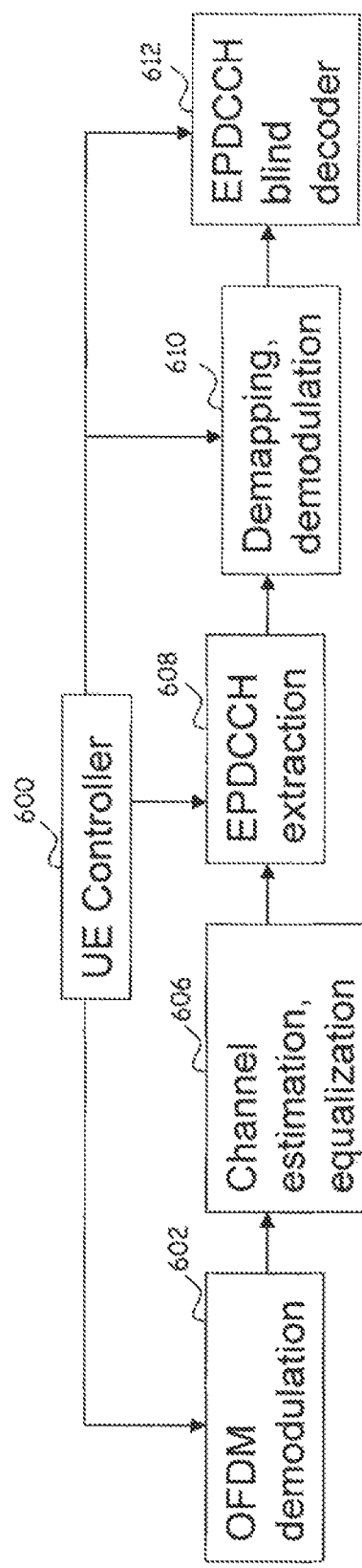
FIGS. 6A-6B are simplified block diagrams of a user equipment (UE) according to the present invention.

Referring now to FIG. 6A, there is a simplified block diagram of a user equipment (UE) according to the present invention. The UE includes UE controller 600, which directs operation of the UE for both downlink and uplink operation. In particular, UE controller 600 directs the EPDCCH receiver to receive DCI formats according to a specific transmission mode (Table I). Received OFDM symbols including DMRS and EPDCCH REs are demodulated at block 602. The DMRS are used for channel estimation and equalization at block 606. The EPDCCH is then extracted from the received physical resource grid at block 608 and demapped and demodulated at block 610. At block 612, UE controller 600 directs blind decoding 612 of the received EPDCCH to identify respective control information.

Figure 6B:
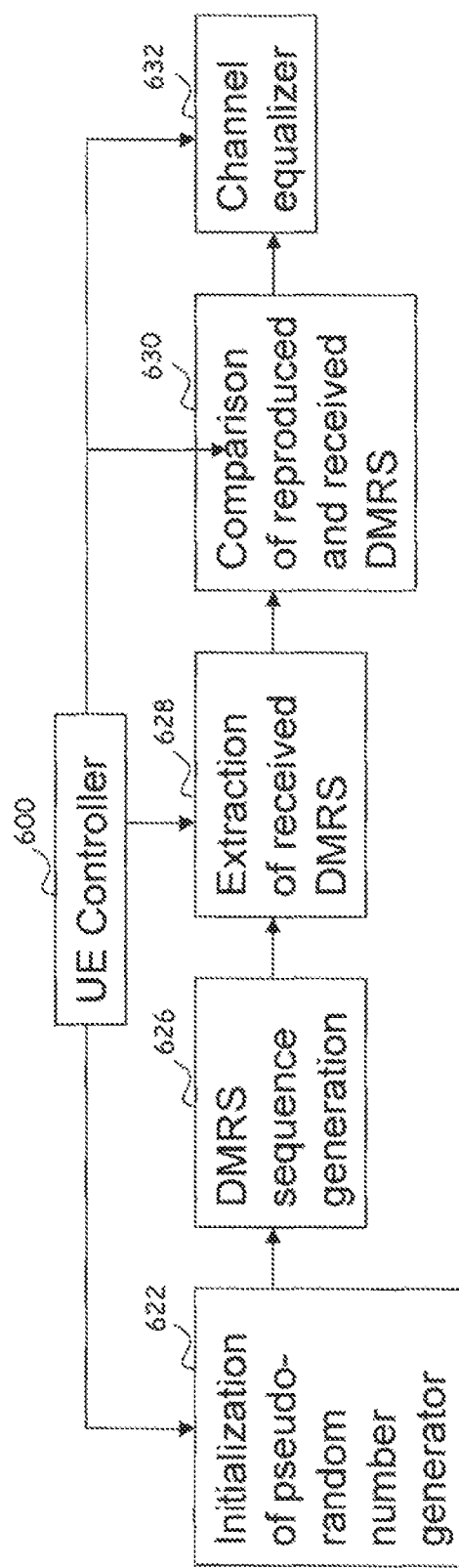

Referring now to FIG. 6B, the channel estimation and equalization at block 606 in FIG. 6A is explained in more detail. In order to estimate the channel for demodulation of the received EPDCCH, the UE controller 500 reproduces the UE-specific DMRS sequence using the pseudo-random number generator at block 622. In particular, the pseudo-random number generator is initialized according to equation [1] above. The output of block 622 is then used at block 626 to generate the DMRS sequence transmitted by the respective eNB. The DMRS associated with the EPDCCH the UE is blindly decoding at block 612 is then extracted from the received physical resource grid at block 208 and compared to the output of block 626 at block 630. The output of block 630, namely the channel estimates, are then used to equalize the channel distortions at block 632.

Figure 7A:
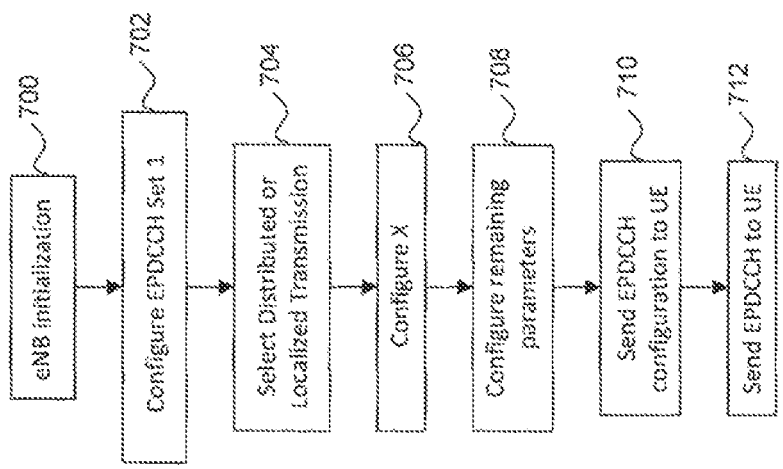
FIG. 7A is a flow chart showing configuration of EPDCCH SET 1 according to the present invention.

Turning now to FIG. 7A, there is a flow chart showing configuration of a single EPDCCH Set 1. The eNB is first initialized at block 700 and receives data to be transmitted to the UE. The eNB configures EPDCCH Set 1 for transmitting the received data and corresponding control information at block 702. At block 704 the eNB selects either a distributed or localized transmission method for the EPDCCH configuration. For a distributed transmission method, the eNB preferably distributes the EPDCCH into multiple PRBs in different subframes. Alternatively, for localized transmission, the eNB preferably transmits the entire EPDCCH in a PRB pair of a single subframe. At block 706, the eNB selects parameter X which the UE uses to initialize or seed the pseudo-random number generator and to generate a pseudo-random DMRS sequence used for demodulation of the associated EPDCCH. The same X is also used to generate a scrambling sequence for the associated EPDCCH. At block 708, the eNB configures remaining parameters of the EPDCCH Set 1 configuration. This provides relevant control information and informs the UE if transmission is localized or distributed and whether the eCCE search space is common or UE-specific. The eNB then transmits the EPDCCH configuration to the UE at block 710. The eNB subsequently transmits the EPDCCH to the UE at block 712.

When the UE tries to blindly decode an EPDCCH in the physical resources associated with EPDCCH Set 1 it uses the parameters received in the configuration of EPDCCH Set 1. By configuring a single EPDCCH Set 1 it is possible to only configure distributed transmissions of downlink control information where one EPDCCH candidate comprises resource elements from different PRBs. Alternatively, the single EPDCCH Set 1 can be configured for localized transmission. Hence, the UE only monitors either localized or distributed EPDCCH candidates and there is a single EPDCCH RRC configuration comprising, among other things, the parameter X for initialization of the DMRS pseudo-random number generator associated with the EPDCCH and the physical resources reserved for the EPDCCH.

Figure 7B:
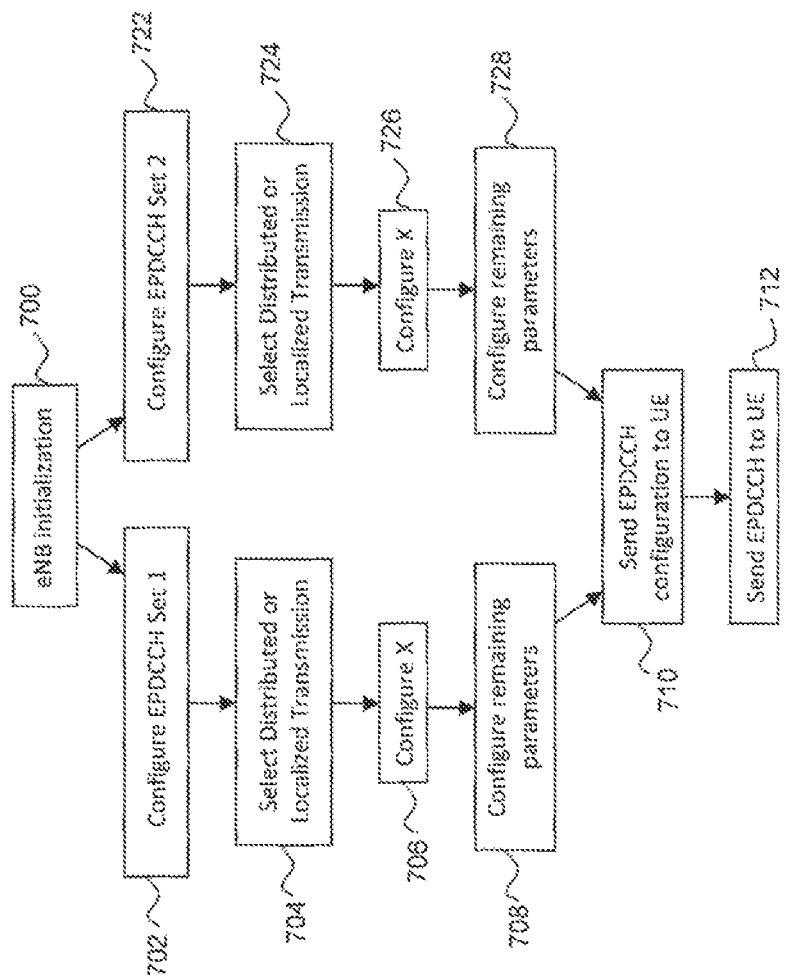
FIG. 7B is a flow chart showing configuration of EPDCCH SET 1 and EPDCCH SET 2 according to the present invention.

Referring next to FIG. 7B, there is a flow chart showing configuration of two EPDCCH Sets 1 and 2 for the same UE. The left branch operates as previously described with regard to FIG. 7A as indicated by the same identification numerals. The eNB configures EPDCCH Set 2 for transmitting the received data and corresponding control information at block 722. At block 724, the eNB selects either distributed or localized transmission without regard to the selection at block 704. For a distributed transmission method, the eNB preferably distributes the eREGs forming one eCCE into multiple PRBs in the same subframe. Alternatively, for localized transmission, the eNB preferably transmits the entire eCCE in a single PRB pair of a single subframe. At block 726, the eNB selects the same or a different parameter X from the selection at block 706 which the UE uses to initialize or seed the pseudo-random number generator and generate a pseudo-random DMRS sequence used for demodulation of an EPDCCH associated with EPDCCH Set 2. The same X is also used to generate a scrambling sequence for the EPDCCH associated with Set 2. At block 728, the eNB configures remaining parameters of the EPDCCH Set 2 configuration. This provides relevant control information and informs the UE if transmission is localized or distributed and whether the eCCE search space is common or UE-specific. The eNB then transmits the EPDCCH Set 2 configuration together with the EPDCCH Set 1 configuration to the UE at block 710. The eNB subsequently transmits the EPDCCH to the UE at block 712. As the UE does not initially know if the received EPDCCH is associated with either Set 1 or Set 2 it has to blindly decode both sets. When estimating the channel for demodulation and blind detection of an EPDCCH associated with Set 1, the UE use the X configured at block 706 for initialization of the pseudo-random number generator to generate the corresponding DMRS sequence. When estimating the channel for demodulation and blind detection of an EPDCCH associated with Set 2, the UE uses the X configured at block 726 for initialization of the pseudo-random number generator to generate the corresponding DMRS sequence. Although the flow chart shows operation of the left and right branches in parallel, operation of the branches may also proceed sequentially such that steps 702 through 710 are performed first and steps 722 through 730 are perforated second. Operation in other orders such as a combination of serial and parallel processing may also be used.

By configuring both EPDCCH Sets 1 and 2 the eNB can configure the UE to monitor both localized and distributed EPDCCH candidates in the same subframe. This configuration allows the network to harness multi-user diversity and beamforming gains through frequency-selective scheduling and space-time signal processing by transmitting an EPDCCH in the physical resources associated with EPDCCH Set 1 configured for localized transmission. At the same time, the network can revert to distributed transmission without the need for RRC reconfiguration by transmitting an EPDCCH in the physical resources associated with EPDCCH Set 2 configured for distributed transmission. In other words, this embodiment allows the eNB to configure two EPDCCH sets, one for localized and one for distributed transmission, so that the eNB can dynamically decide whether to encode a UE's downlink control information in the search space associated with either the localized or distributed set. Since the UE is configured to monitor both search spaces, no RRC re-configuration to switch between localized and distributed is necessary.

When the UE is configured to monitor both EPDCCH Sets 1 and 2 within the same sub-frame, in order to reduce the RRC signaling overhead, the UE behavior can be standardized to assume the same RRC configuration for both sets. Such a design permits the eNB to selectively reconfigure parameters such as X for either set to facilitate different operational modes. For example, for distributed EPDCCH candidates in Set 1, the UE is configured with X corresponding to the physical cell ID, whereas for localized EPDCCH candidates in Set 2, it is configured with X corresponding to a virtual cell ID.

At FIG. 7C, there is a flow chart showing configuration of the EPDCCH for a Common search space. This method is appropriate when data transmissions of control commands are intended for multiple users such as with broadcast transmissions. The eNB is first initialized at block 700 and receives data to be transmitted to multiple UEs, for instance system information. The eNB configures the EPDCCH for transmitting the received data and corresponding control information at block 742. At block 744 the eNB selects either a distributed or localized transmission method. For a distributed transmission method, the eNB preferably distributes the eREGs forming one eCCE into multiple PRBs of the same subframe. Alternatively, the localized transmission, the eNB preferably transmits the entire eCCE in a single PRB pair of a single subframe. At block 746, the eNB selects parameter X which the UE uses to initialize or seed the pseudo-random number generator and to generate a pseudo-random DMRS sequence used for demodulation of the common search space of an associated EPDCCH. Here, each designated UE is configured with the same parameter X. However, the configuration of the EPDCCH, including X, is still UE-specific. The same X is also used generate a scrambling sequence for the EPDCCH transmitted in the common search space. At block 748, the eNB configures remaining parameters of the EPDCCH configuration for the common search spade. This provides relevant control information and informs the UE that the transmission is localized or distributed and that the search space is common. The eNB then transmits the EPDCCH configuration to the designated UEs at block 750. The eNB subsequently transmits the EPDCCH to the designated UEs at block 752.

The benefit of configuring the initialization parameter X of the pseudo-random number generator for each EPDCCH set (if more than one is configured) and for the UE-specific and common search space separately is that the UE can be configured with several X but for each blind decoding attempt only one X is applicable. For instance, the network can configure different X for localized and distributed transmission of downlink control information in the UE-specific search space of the EPDCCH or, if a common search space is defined for the EPDCCH, the initialization could be different for the UE-specific and the common search space. Either way, the UE knows which initialization parameters to use when blindly decoding an EPDCCH candidate. So while the eNB may configure several X and/or $n_{SCID}$ for a UE, they are never dynamically signaled nor does the UE need to perform several blind decoding attempts for the same EPDCCH candidate to try different initializations.

Still further, while numerous examples have thus been provided, one skilled in the art should recognize that various modifications, substitutions or alterations may be made to the described embodiments while still falling with the inventive scope as defined by the following claims. Other combinations will be readily apparent to one of skill in the art having access to the instant specification.

What is claimed is:

1. A method of operating a base station, comprising:
   initializing a pseudo-random sequence generator for generating a pseudo- random sequence based on at least one of a first value associated with a first enhanced physical downlink control channel (EPDCCH) set and a second value associated with a second EPDCCH set, the first and second EPDCCH sets corresponding, respectively, to first and second sets of physical resource blocks (PRBs);
   generating a plurality of demodulation reference signals (DMRS) using the initialized pseudo-random sequence generator;
   mapping the DMRS to one or more PRBs configured for EPDCCH transmission;
   configuring the first EPDCCH set and the second EPDCCH set via Radio Resource Control (RRC) signaling;
   transmitting the first value and the second value via RRC signaling; and transmitting the EPDCCH.

2. The method of claim 1, further comprising transmitting an EPDCCH configuration to the UE.

3. The method of claim 1, further comprising mapping the DMRS and the EPDCCH into a plurality of physical resource block (PRB) pairs in a single subframe.

4. The method of claim 1, further comprising mapping the DMRS and the EPDCCH into a single physical resource block (PRB) pair in a single subframe.

5. The method of claim 1, further comprising:
   mapping the DMRS and the EPDCCH into a plurality of physical resource block (PRB) pairs in a single subframe for distributed transmission;
   mapping the DMRS and the EPDCCH into a single physical resource block (PRB) pair in a single subframe for localized transmission; and
   initializing the pseudo-random sequence generator differently for distributed and localized transmission.

6. The method of claim 1, further comprising:
   mapping a second modulated DMRS and a second EPDCCH; and
   initializing the pseudo-random sequence generator differently for the second DMRS than for the first DMRS.

7. The method of claim 1, further comprising scrambling the EPDCCH with a pseudo-random sequence initialized by an integer X.

8. A base station configured to:
   initialize a pseudo-random sequence generator for generating a pseudo-random sequence based on at least one of a first value associated with a first enhanced physical downlink control channel (EPDCCH) set and a second value associated with a second EPDCCH set, the first and second EPDCCH sets corresponding, respectively, to first and second sets of physical resource blocks (PRBs);
   generate a plurality of demodulation reference signals (DMRS) using the initialized pseudo-random sequence generator;
   map the DMRS to one or more PRBs configured for EPDCCH transmission;
   configure the first EPDCCH set and the second EPDCCH set via Radio Resource Control (RRC) signaling;
   transmit the first value and the second value via RRC signaling; and
   transmit the EPDCCH.

9. The base station of claim 8, further configured to transmit an EPDCCH configuration to the UE.

10. The base station of claim 8, further configured to map the DMRS and the EPDCCH into a plurality of physical resource block (PRB) pairs in a single subframe.

11. The base station of claim 8, further configured to map the DMRS and the EPDCCH into a single physical resource block (PRB) pair in a single subframe.

12. The base station of claim 8, further configured to:
    map the DMRS and the EPDCCH into a plurality of physical resource block (PRB) pairs in a single subframe for distributed transmission;
    map the DMRS and the EPDCCH into a single physical resource block (PRB) pair in a single subframe for localized transmission; and
    initialize the pseudo-random sequence generator differently for distributed and localized transmission.

13. The base station of claim 8, further configured to:
    map a second modulated DMRS and a second EPDCCH; and
    initialize the pseudo-random sequence generator differently for the second DMRS than for the first DMRS.

14. The base station of claim 8, further configured to scramble the EPDCCH with a pseudo-random sequence initialized by an integer X.

* * * * *